(12) United States Patent
Komura et al.

(10) Patent No.: US 12,704,722 B2
(45) Date of Patent: Aug. 11, 2026

(54) ILLUMINATION DEVICE AND DISPLAY DEVICE

(71) Applicant: Magnolia White Corporation, Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 335 days.

(21) Appl. No.: 17/969,695

(22) Filed: Oct. 20, 2022

(65) Prior Publication Data

US 2023/0128012 A1 Apr. 27, 2023

(30) Foreign Application Priority Data

Oct. 22, 2021 (JP) ................................ 2021-173377

(51) Int. Cl.
*G02B 27/01* (2006.01)
*F21V 8/00* (2006.01)

(52) U.S. Cl.
CPC ......... *G02B 27/0172* (2013.01); *G02B 6/002* (2013.01); *G02B 6/0053* (2013.01); *G02B 6/0055* (2013.01)

(58) Field of Classification Search
CPC .............. G02B 27/0172; G02B 27/002; G02B 27/0053; G02B 27/0055
See application file for complete search history.

(56) References Cited

U.S. PATENT DOCUMENTS

2011/0227487 A1* 9/2011 Nichol ................. G02B 6/0018 362/613
2012/0224122 A1* 9/2012 Koganezawa ......... G02B 6/002 349/65
2016/0349444 A1* 12/2016 Robinson ............ G02B 6/0068
2019/0101689 A1 4/2019 Cui et al.

FOREIGN PATENT DOCUMENTS

CN 102721995 A 10/2012
CN 107850804 A 3/2018
JP 2022-1913 A 1/2022
WO 2016191598 A1 12/2016

OTHER PUBLICATIONS

Office Action issued on Aug. 17, 2023, in corresponding Taiwanese patent Application No. 111139994, 6 pages.
Chinese Office Action issued Jun. 16, 2025, in corresponding CN Application No. 202211286427.3, 21pp.
Office Action issued Mar. 6, 2026, in DE Application No. 10 2022 210 757.8, 17pp.

* cited by examiner

*Primary Examiner* — Abdulmajeed Aziz
*Assistant Examiner* — Jessica M Apenteng
(74) *Attorney, Agent, or Firm* — XSENSUS LLP

(57) ABSTRACT

According to one embodiment, an illumination device includes a light guide, a plurality of light source elements, and a reflector including a first portion parallel to a second edge of the light guide and a second portion parallel to a third edge of the light guide, and the third edge includes first short edges extending in the first direction and second short edges extending in the second direction, which are alternately arranged, and the second portion includes first pieces extending in the first direction and second pieces extending in the second direction, which are alternately arranged.

10 Claims, 10 Drawing Sheets

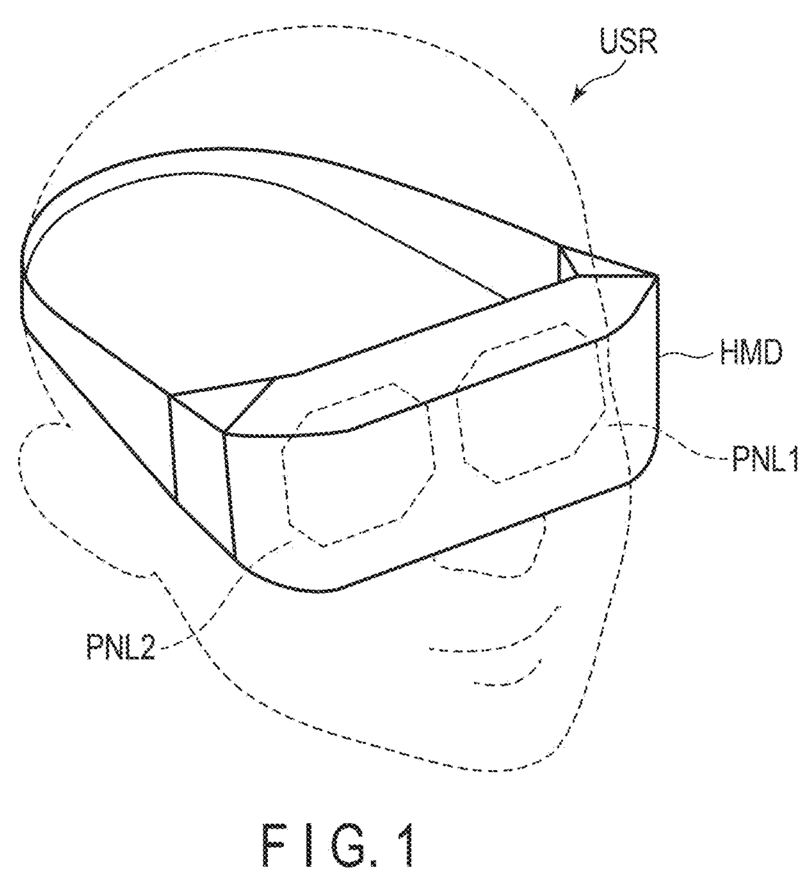
F I G. 1
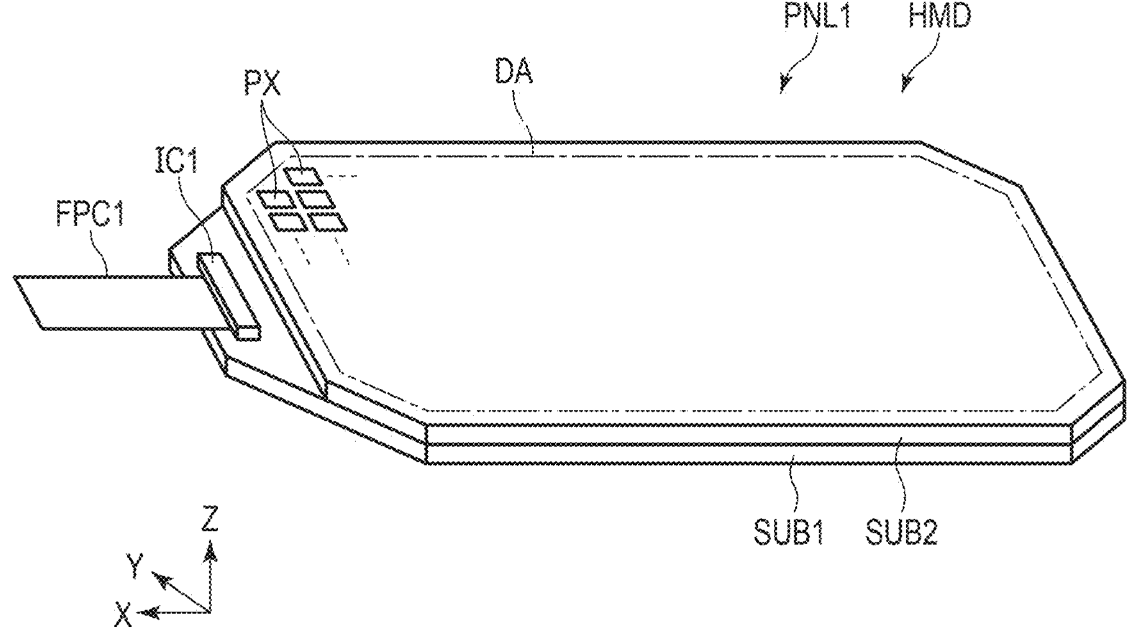
F I G. 2

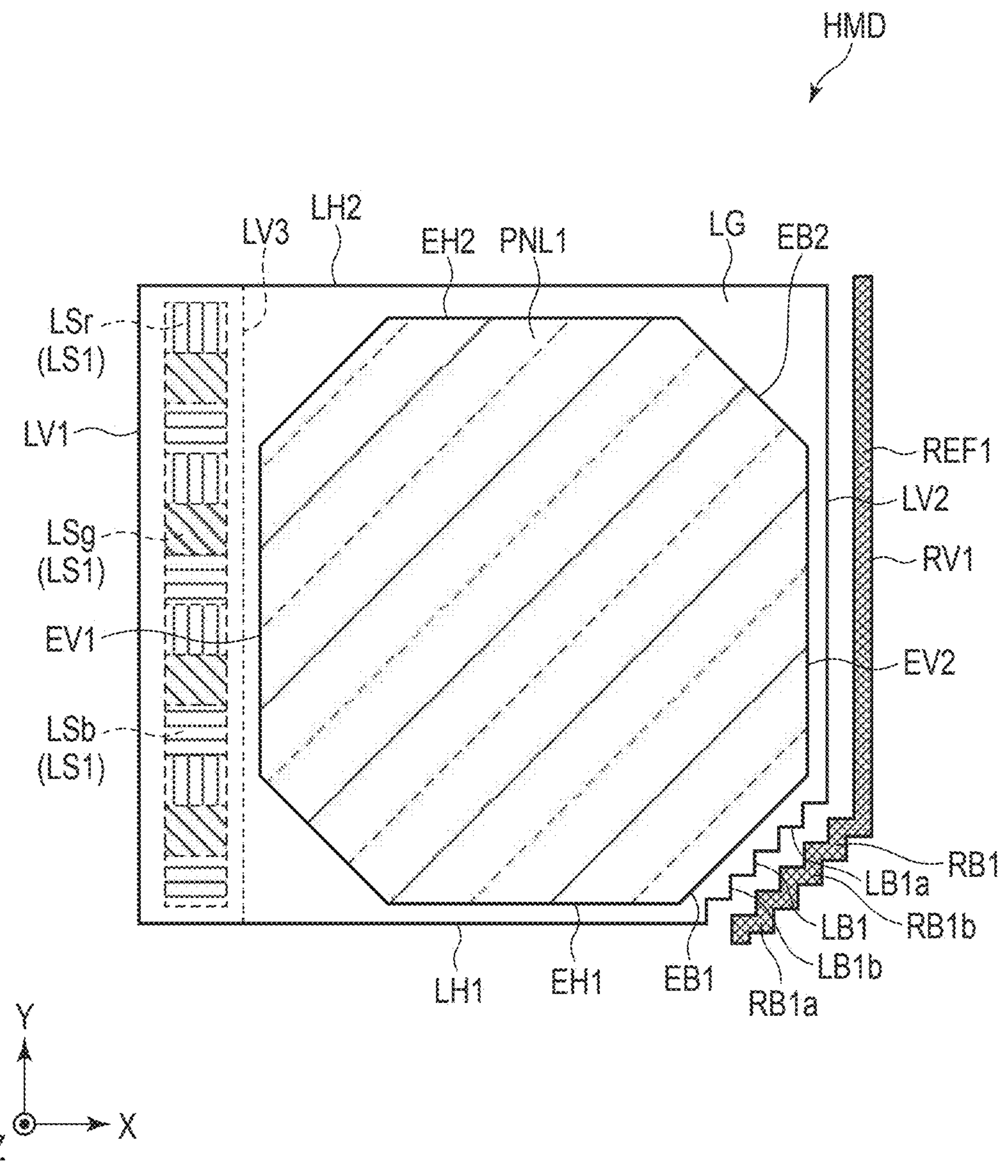
F I G. 6

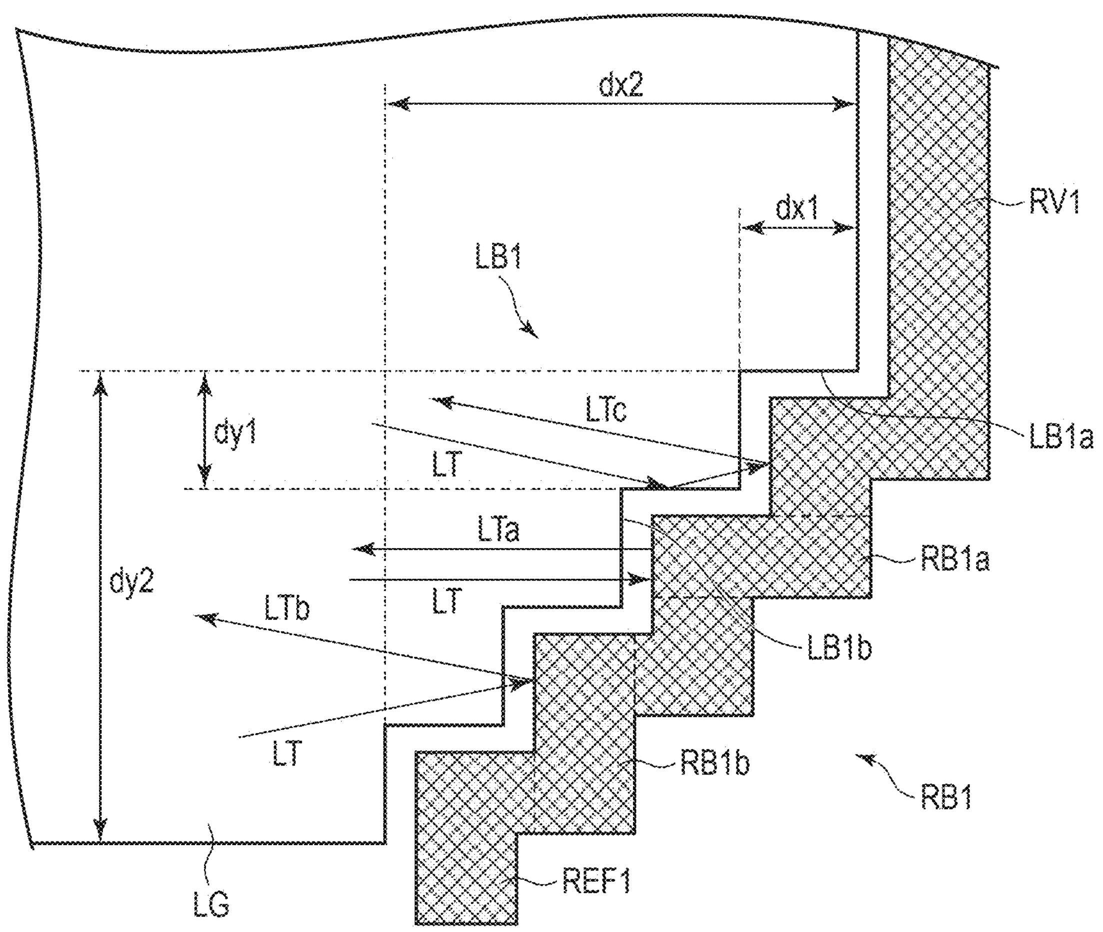
F I G. 7

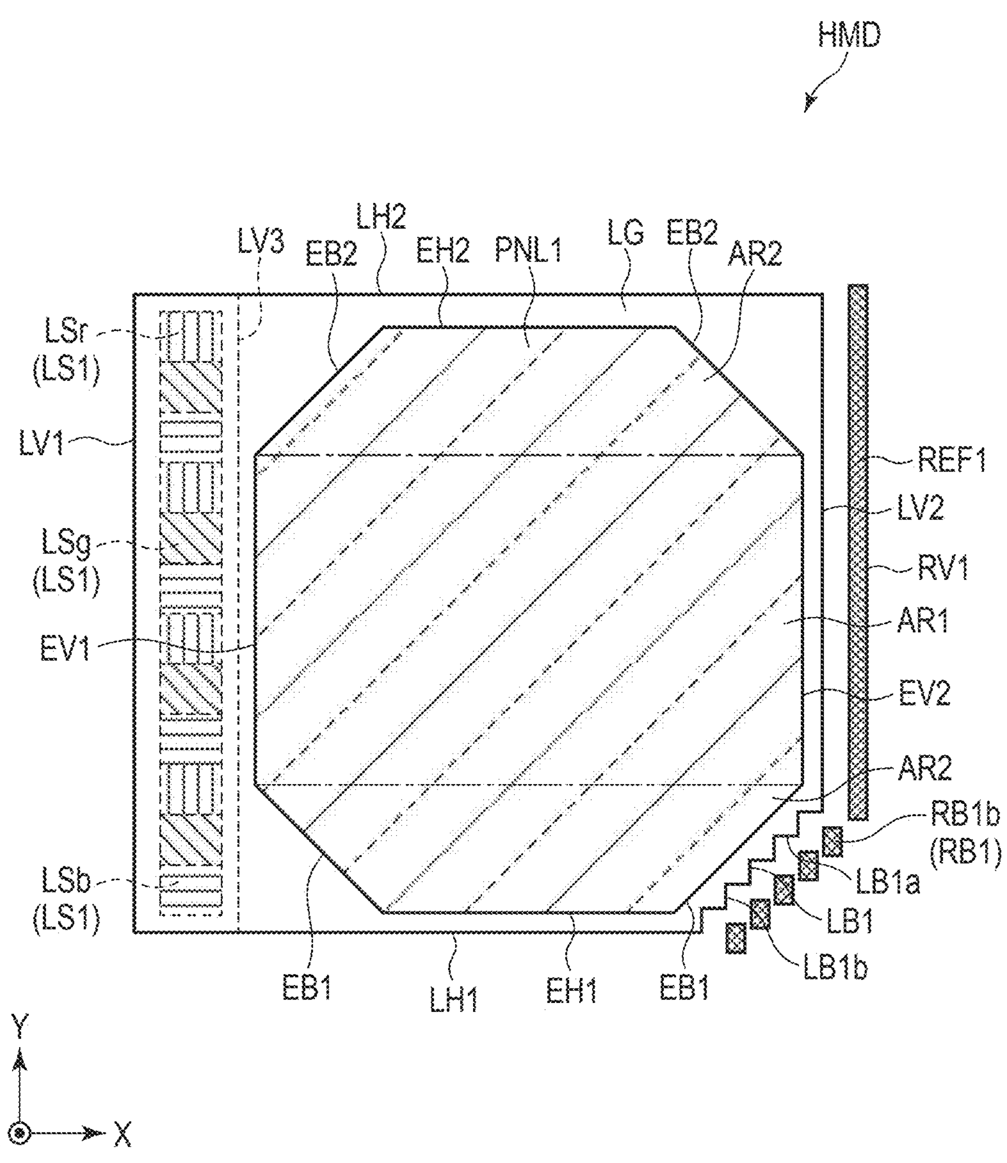
F I G. 10

ILLUMINATION DEVICE AND DISPLAY DEVICE

CROSS-REFERENCE TO RELATED APPLICATIONS

This application is based upon and claims the benefit of priority from Japanese Patent Application No. 2021-173377 filed Oct. 22, 2021, the entire contents of which are incorporated herein by reference.

FIELD

Embodiments described herein relate generally to an illumination device and a display device.

BACKGROUND

In recent years, technologies which provides, for example, virtual reality (VR), using a display device called a head-mounted display (HMD), which is mounted on the user's head, are have been attracting attention.

BRIEF DESCRIPTION OF THE DRAWINGS

FIG. 1 is a perspective view showing an example of the appearance of a display device according to an embodiment.

FIG. 2 is a perspective view showing schematically showing of a display panel of the display device of the embodiment.

FIG. 6 is a cross-sectional view schematically showing a configuration example of the display device.

FIG. 7 is a partially enlarged view of FIG. 6.

FIG. 10 is a plan view showing a configuration example of a display device in an embodiment.

DETAILED DESCRIPTION

Figure 3:
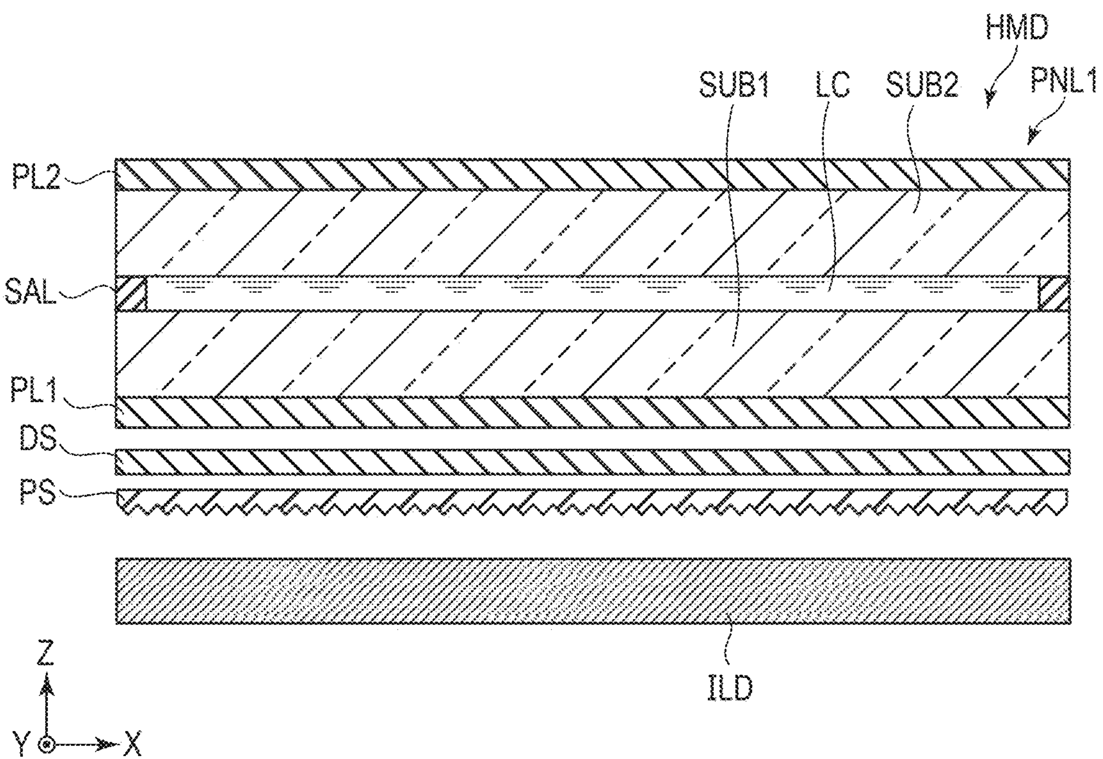
FIG. 3 is a cross-sectional view schematically showing a configuration example of the display device.

In general, according to one embodiment, an illumination device comprising: a light guide including a first edge extending in a first direction, a second edge extending in a second direction intersecting the first direction and a third edge provided between the first edge and the second edge; a plurality of light source elements opposing a fourth edge of the light guide, which opposes the second edge; and a reflector including a first portion parallel to the second edge and a second portion parallel to the third edge, wherein the third edge includes first short edges extending in the first direction and second short edges extending in the second direction, which are arranged alternately, and the second portion includes first pieces extending in the first direction and second pieces extending in the second direction, which are arranged alternately.

According to another embodiment, a display device comprising: an illumination device comprising: a light guide including a first edge extending in a first direction, a second edge extending in a second direction intersecting the first direction and a third edge provided between the first edge and the second edge; a plurality of light source elements opposing a fourth edge of the light guide, which opposes the second edge; and a reflector including a first portion parallel to the second edge and a second portion parallel to the third edge; and a polygonal display panel comprising a rectangular-shaped first area and two trapezoid-shaped second areas interposing the first area therebetween, which are disposed along the second direction, wherein the third edge includes first short edges extending in the first direction and second short edges extending in the second direction, which are arranged alternately, and the second portion includes first pieces extending in the first direction and second pieces extending in the second direction, which are arranged alternately.

According to still another embodiment, a display device comprising: an illumination device comprising: a light guide including a first edge extending in a first direction, a second edge extending in a second direction intersecting the first direction and a third edge provided between the first edge and the second edge; a plurality of light source elements opposing a fourth edge of the light guide, which opposes the second edge; and a reflector including a first portion parallel to the second edge and a second portion parallel to the third edge; and a polygonal display panel comprising a rectangular-shaped first area and two trapezoid-shaped second areas interposing the first area therebetween, which are disposed along the second direction, wherein the third edge includes first short edges extending in the first direction and second short edges extending in the second direction, which are arranged alternately, and the second portion includes a plurality of pieces extending in the second direction and spaced apart from each other.

An object of the embodiments is to provide an illumination device which emits light of a uniform luminance distribution, and a display device which can emit video light of a uniform luminance distribution by being illuminated by the illumination light.

Embodiments will be described hereinafter with reference to the accompanying drawings. Note that, throughout the embodiments, common structural elements are denoted by the same symbols and redundant explanations are omitted. Further, the drawings are schematic diagrams to facilitate understanding of the embodiments, and the shapes, dimensions, ratios, etc., may differ from actual conditions, but they may be redesigned as appropriate, taking into account the following descriptions and conventionally known technology.

The followings are detailed descriptions of a display device according to one embodiment with reference to the drawings.

In the embodiment, a first direction X, a second direction Y and a third direction Z are orthogonal to each other, but they may intersect at an angle other than 90 degrees. In the following descriptions, a direction forwarding a tip of an arrow indicating the third direction Z is referred to as "upward" or "above" and a direction forwarding oppositely from the tip of the arrow is referred to as "downward" or "below". The first direction X, the second direction Y and third direction Z may as well be referred to as an X direction, a Y direction and a Z direction, respectively.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the display device on a tip side of an arrow in the third direction Z, and viewing from this observation position toward the X-Y plane defined by the first direction X and the second direction Y is referred to as a planar view. Viewing a cross section of the transistor in an X-Z plane defined by the first direction X and the third direction Z or a Y-Z plane defined by the second direction Y and the third direction Z is referred to as a cross-sectional view.

Embodiment

FIG. 1 is a diagram showing an example of the appearance of a display device according to an embodiment. In this embodiment, the display device includes a head-mounted display (HMD) which is mounted on the user's head when used. Such a display device is used to provide, for example, virtual reality (VR) to a user who wears the display device on his/her head.

As shown in FIG. 1, the display device HMD comprises a display panel PNL1 and a display panel PNL2. The display panels PNL1 and PNL2 may as well be referred to as a first display panel and a second display panel, respectively. The display panels PNL1 and PNL2 are display panels independent from each other.

While a user USR wears the display device HMD on his/her head, the display panels PNL1 and PNL2 are positioned so that they are located in front of the left eye and the right eye of the user, respectively. In this embodiment, the display panels PNL1 and PNL2 are assumed to be liquid crystal display panels with liquid crystal layers.

FIG. 2 is a perspective view showing schematically showing of a display panel provided in the display device of the embodiment. Here, the configuration of the display panel PNL1 will be mainly explained.

The display panel PNL1 shown in FIG. 2 comprises a first substrate SUB1 and a second substrate SUB2 opposing the first substrate SUB1. The display panel PNL1 includes a display area DA for displaying images. Further, the display panel PNL1 comprises a plurality of pixels PX arranged in a matrix in the display area DA.

Moreover, the display panel PNL1 comprises a drive IC chip IC1 which drives the display panel PNL1 and a flexible printed circuit FPC1 which transmits control signals to the display panel PNL1. The flexible printed circuit FPC1 is connected to a control module (host computer) which controls the operation of the display device HMD.

In the example shown in FIG. 2, the first substrate SUB1 and the second substrate SUB2 each include long sides along the first direction X and short sides along the second direction Y. The first substrate SUB1 and the second substrate SUB2 2 each have an octagonal shape in plan view. This shape can as well be described as a rectangular shape whose corners are notched. Note that the shape of the display panel PNL1 and the display panel PNL2 is not limited to this, and it may as well be any polygonal shape. Note that the shape of the display panels may be any type which can prevent the abutting to the user USR's nose, which will be described later, or it should only be such that the corners adjacent to the nose of the user USR are notched.

FIG. 3 is a cross-sectional view showing an example of a schematic configuration of a display device. The display panel PNL1 further comprises a sealant SAL and a liquid crystal layer LC in addition to the first substrate SUB1 and the second substrate SUB2 described above. In the display panel PNL1, the first substrate SUB1 and the second substrate SUB2 are attached together by the sealant SAL. The liquid crystal layer LC is sealed in between the sealant SAL and each of the substrates SUB1 and SUB2.

In the display device HMD, a first polarizer PL1 is attached to a lower surface of the first substrate SUB1 (the surface not opposing the second substrate SUB2). On an upper surface of the second substrate SUB2 (the surface not opposing the first substrate SUB1), a second polarizer PL2 is attached. Polarization axes of the first polarizer PL1 and the second polarizer PL2 are orthogonal to each other.

The display device HMD comprises an illumination device ILD (which may as well be called a backlight unit) on a rear surface side of the display panel PNL1 (that is, an opposite side to the display surface). The illumination device ILD is connected to the control module. In the display device HMD, the display panel PNL1 is illuminated by the illumination device ILD to display images on the display panel PNL1.

The display device HMD comprises a prism sheet PS placed between the display panel PNL1 and the illumination device ILD. Further, the display device HMD comprises a diffusion sheet DS (diffusion layer) provided between the prism sheet PS and the display panel PNL1. The prism sheet PS comprises a number of prisms extending parallel to, for example, the second direction Y. The prisms are formed, for example, on a lower surface of the prism sheet PS (the surface opposing the illumination device ILD). Note that the prisms may as well be formed on an upper surface of the prism sheet PS (the surface opposing the display panel PNL1).

The prism sheet PS converts light illuminated by the illumination device ILD into light substantially parallel to the third direction Z. Here, the "light substantially parallel to the third direction Z" includes not only light strictly parallel to the third direction Z, but also light which has been converted so that the inclination thereof with respect to the third direction Z is sufficiently smaller by the prism sheet PS than when illuminated by the illumination device ILD. From the viewpoint of maintaining the polarization of the illumination light of the illumination device ILD, the prisms of the prism sheet PS should preferably be formed on the lower surface. The light that has passed through the prism sheet PS is diffused by the diffusion sheet DS to illuminate the display panel PNL1. Even if the viewing angle of the light passing through the prism sheet PS is narrow, the viewing angle can be widened by diffusing the light with the diffusion sheet DS.

Note that in FIGS. 2 and 3, the display panel PNL1 is described, but the display panel PNL2 as well has a configuration similar to that described in FIGS. 2 and 3.

Figure 4:
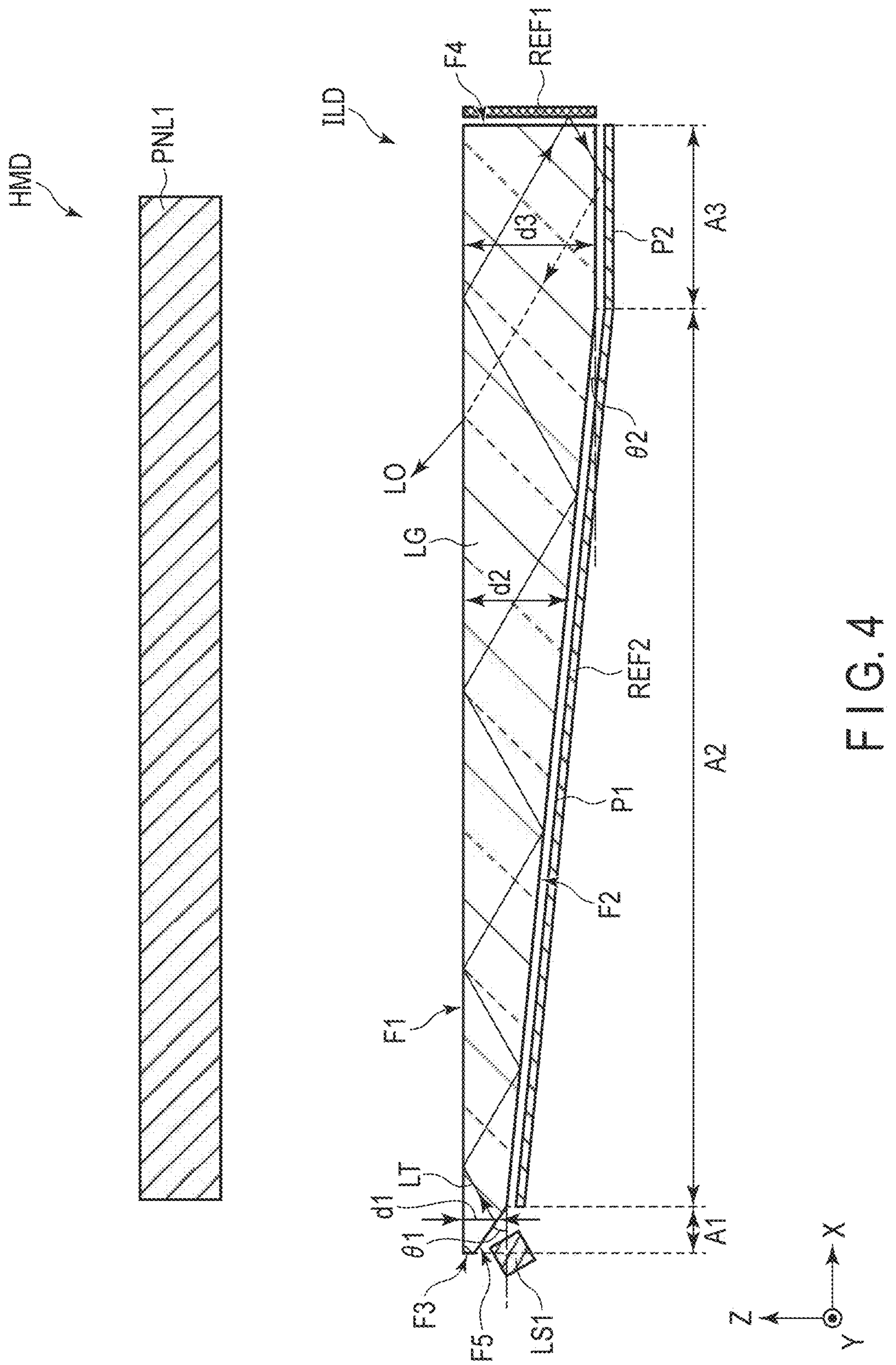
FIG. 4 is a cross-sectional view schematically showing a configuration example of an illumination device.

FIG. 4 is a cross-sectional view schematically showing a configuration example of the illumination device. The light guide LG of the illumination device ILD comprises a first main surface F1 opposing the display panel PNL1, a second main surface F2 on an opposite side to the first main surface F1, a first side surface F3 and a second side surface F4 on an opposite side to the first side surface F3. Between the second main surface F2 and the first side surface F3, an inclined surface F5 is formed, and a light source element LS1 is formed to oppose the inclined surface F5. Between the light source element LS1 and the inclined surface F5, an optical element such as a lens may be further provided to adjust the width and angle of the light from the light source element LS1.

The illumination device ILD includes a reflector REF1 opposing the second side surface F4 and a reflector REF2 opposing the second main surface F2.

The second main surface F2 of the light guide LG includes a first area A1, a second area A2 and a third area A3. In this embodiment, the first area A1, the second area A2 and the third area A3 are disposed along the first direction X from closer to the light source element LS1. The length of the second area A2 along the first direction X is greater than that of the third area A3, and the length of the second area A2 along the first direction X is greater than that of the first area A1.

The thickness of the light guide LG in the first area A1 is represented by a distance d1, which increases from the first side surface F3 towards the boundary between the first area A1 and the second area A2. The thickness of the light guide LG in the second area A2, a distance d2 increases from the boundary between the first area A1 and the second area A2 towards the boundary between the second area A2 to the boundary of the second area A2 and the third area A3. In the example shown in FIG. 4, the thickness of the light guide LG in the third area A3, a distance 3 is constant. The distance d3 is greater than the distances d1 and d2 in the respective positions of the first and second regions A1 and A2 (d3>d1 and d3>d2).

The first area A1 is inclined at a first angle θ1 with respect to the first main surface F1. The second area A2 is inclined at a second angle θ2 with respect to the first main surface F1. Both the angles θ1 and θ2 are acute angles. The angle θ1 is greater than the angle θ2. Note that in this embodiment, the angle θ1 is an acute angle, the angle is not limited to this, but the angle θ1 may be 90 degrees or obtuse angle.

With the third area A3 thus provided, the luminance distribution of light emitted from the first main surface F1 can be made uniform. Here, let us consider the case where the third area A3 is not provided, that is, no flat portion is provided. Light entering the light guide LG from the light source element LS1 propagates inside the light guide LG and is reflected by the reflector REF1. In the case where the third area A3 is not provided, the light reflected by the reflector REF1 is reflected by a convex portion (which may as well be referred to as a groove or prism) provided below the light guide LG, the condition of total reflection of the first main surface F1 is no greater satisfied, and the light is emitted from the first main surface F1 of the light guide LG as outgoing light LO. In this case, when the third area A3 is not provided, the light reflected by the convex area near the reflector REF1 proceeds in the first direction X and its opposite direction, to be emitted from the first main surface F1. That is, the light is not emitted from the vicinity of the reflector REF1 on the first main surface F1, which may cause uneven luminance of the emitted light from the first main surface F1.

However, in the case where the third area A3 is provided, light is reflected by the convex portion of the third area A3, located near the second area A2 is reflected by an upper portion of the reflector REF1 and then emitted from the vicinity of the reflector REF1 in the first main surface F1. Thus, unevenness in luminance of the emitted light can be suppressed and the uniformity of luminance distribution can be improved.

Here, the optical path of the light generated by the light source element until it is emitted from the illumination device ILD will be explained. The outgoing light emitted from the light source element LS1 enters the light guide LG from the inclined surface F5. The entering light LT repeats total reflection between the first main surface F1 and the second main surface F2 of the light guide LG and extends along the first direction X. The light LT having reached the reflector REF1 is reflected by the reflector REF1. The reflected light LT is extended in a direction opposite to the first direction X. The light LT entering the convex portion (which may as well be referred to as a groove or prism) provided below the light guide LG no longer satisfies the condition of total reflection and is emitted from the first main surface F1 of the light guide LG as outgoing light LO. The luminance of the light LT having reached the reflector REF1 is sufficiently diffused and made uniform in the second direction Y. Therefore, the luminance of the light LO emitted from the first main surface F1 is uniform in the second direction Y. The outgoing light LO is the illumination light of the illumination device ILD.

The light source element LS1 can use a laser light source (laser diode) such as a semiconductor laser which emits laser beams. The laser light may be diffusing light spreading from the center in the irradiation direction, or it may be a polarized laser light.

As described above, the display device HMD of this embodiment requires two display panels PNL1 and PNL2. With the shape of each display panel, in which the corners are notched, it is possible to prevent the display panels from abutting the nose of the user USR.

Figure 5:
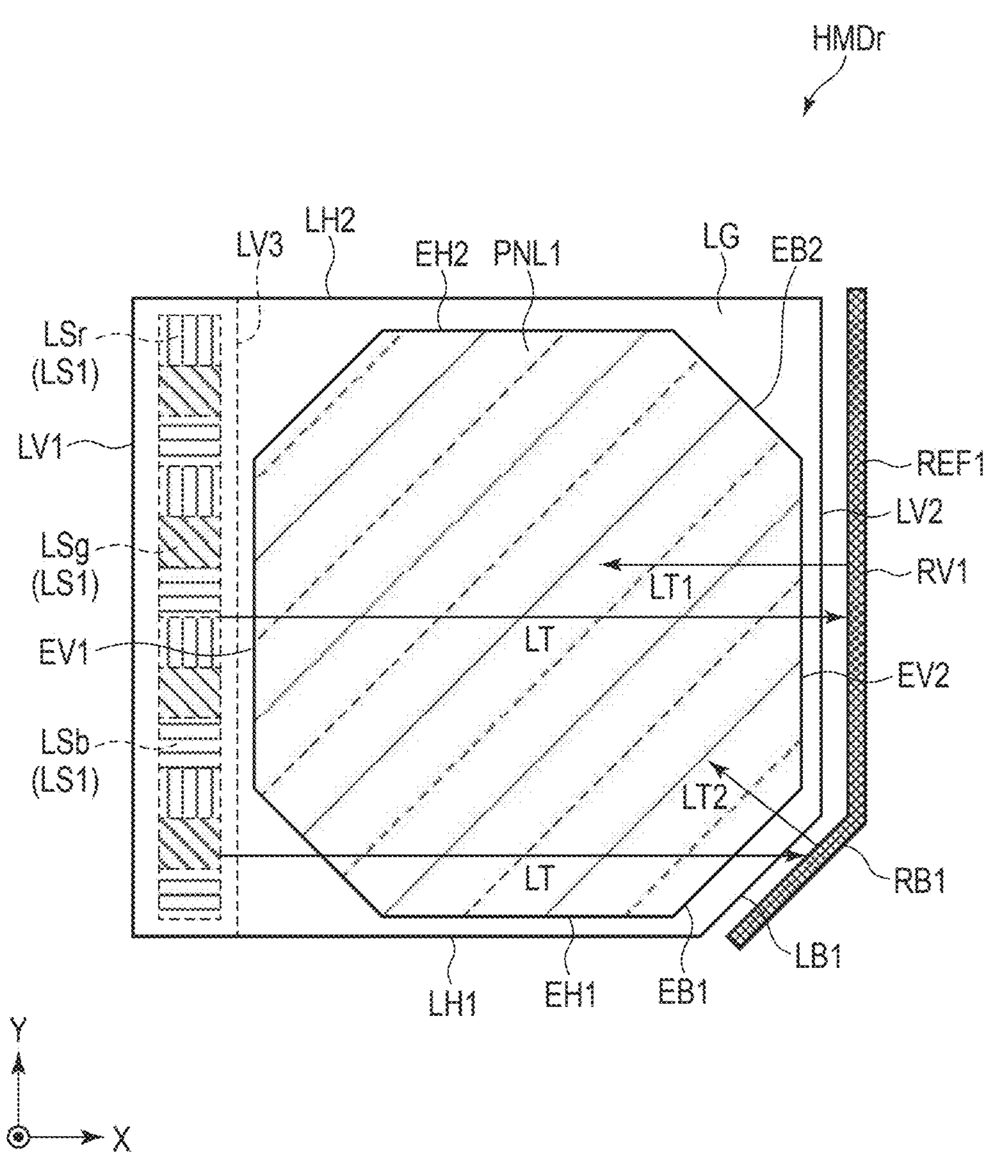
FIG. 5 is a plan view schematically showing a configuration example of a display device of a comparative example.

However, such notched corners may cause non-uniformity of reflected light. FIG. 5 is a plan view schematically showing one of configurations of a display device of a comparative example. In a display device HMDr, a polygonal, for example, octagonal-shape display panel PNL1 includes an edge EH1 and an edge EH2 extending in a direction parallel to the first direction X, an edge EV1 and an edge EV2 extending in a direction parallel to the second direction Y, and an edge EB1 and an edge EB2 provided on the edge EH1 and the edge EV1 and extending in a direction having an acute angle with respect to the first direction X. The direction having an acute angle with respect to the first direction X may as well be referred to as the fourth direction. However, when the third direction Z is omitted, such direction may as well be referred to as the third direction.

Below the display panel PNL1, an illumination device ILD is provided. The light guide LG of the illumination device ILD includes an edge LH1, edge LH2, edge LV1 and edge LB1, which extend in respective directions parallel to the edge EH1, edge EH2, edge EV1, edge EV2 and edge EB1.

Along the edge EH2, edge EV2 and edge EB2, a reflector REF1 is provided. The reflector REF1 includes a portion RV1 and a portion RB1 extends in respective directions parallel to the edges EV2 and EB1.

The edge EH1, edge EH2, edge LH1 and edge LH2 extend along the first direction X. The edge EV1, edge EV2, edge LV1, edge LV2 and portion RV1 extend along the second direction Y. The edge EB1, edge LB1 and portion RB1 extending in a direction having an acute angle with respect to the first direction X.

Adjacent to the edge EV1 of the display panel PNL1 and the edge LV3 of the light guide LG, a plurality of light source elements LS1 are provided. The light source elements LS1 include a light source element LSr emitting red light, a light source element LSg emitting green light and a light source element LSb emitting blue light. The light source elements LSr, LSg and LSb are arranged in this order along the second direction Y.

The edge LV1 and edge LV2 shown in FIG. 5 are respectively correspond to the first side surface F3 and the second side surface F4 shown in FIG. 4. Between the edge LV1 and edge EV1, the edge EV3 of the light guide LG, which extends in a direction parallel to the second direction Y, is located. The region between the edge EV1 and edge EV3 corresponds to the inclined surface F5 shown in FIG. 4.

The light LT emitted from the light source element LS1 enters the light guide LG from the edge EV2. As explained with reference to FIG. 4, the light is reflected by the reflector REF1 and emitted out upward (the third direction Z) as illumination light. The light LT1 reflected by the portion RV1 of the reflector REF1 has a main light path parallel to the first direction X. Therefore, the light LT1 is outgoing light having a uniform luminance distribution. However, for light LT2 reflected by the portion RB1, the main optical path is non-parallel to the first direction X. Therefore, the luminance distribution of the light LT2 may not achieve uniformity.

In this embodiment, the edge LB1 of the light guide LG and the portion RB1 of the reflector REF1 are made into a staircase shape to achieve uniformity in the luminance distribution of the reflected light. By making the luminance distribution of the reflected light uniform, it is possible to make the luminance distribution uniform in each of the illumination light emitted from the illumination device ILD and the visual light obtained by modulating the illumination light by the display panel.

FIG. 6 is a plan view schematically showing a configuration example of a display device. The display device HMD shown in FIG. 6 includes the LB1 between the edge LV2 and edge LH1 of the light guide LG1. The edge LB1 includes edges LB1*a* parallel to the first direction X and edges LB1*b* parallel to the second direction Y. The edges LB1*a* and LB1*b* are arranged alternately, and constitute a staircase-shaped edge LB1 as a whole. To distinguish them from other edges, the edge LB1*a* and edge LB1*b* may as well be referred to as short edges.

Opposing the edges LB1*a* and LB1*b*, the portions RB1*a* and RB1*b* of the reflector REF1 are arranged. The portions RB1*b* and RB1*b* are pieces disposed parallel along the first direction X and the second direction Y, respectively. The portions RB1*a* and RB1*b* are arranged to alternately overlap each other and thus form the staircase-shaped portion RB1 as a whole.

FIG. 7 is a partially enlarged view of FIG. 6. The light LT propagating along the first direction X is reflected by the portion RB1*b*. The reflected light LTa also propagates in a direction opposite to the first direction X. As in the case of the light LT1 described above, the light LTa is emitted above the light guide LG as outgoing light having a uniform luminance distribution.

The light LT actually propagates through the light guide LG at an angle slightly inclined with respect to the first direction X. In this case as well, the light is emitted from the edge LB1*b* of the light guide LG toward the reflector REF1. The emitted light LTa is reflected by the portions RB1*b* and re-enters the light guide LG.

Since the light LT propagates through the light guide LG at an angle slightly inclined to the first direction X, the light may reach the edge LB1*b* before reaching the edge LB1*b* of the light guide LG. In this case, the light LT is totally reflected by the edge LB1*a* of the light guide LG. After being totally reflected, the light LT is emitted from the edge LB1*b* of the light guide LG toward the reflector REF1. The emitted light LTb is reflected by the portions RB1*b* and re-enters the light guide LG.

The light LTa and the light LTb, as in the case of the light LT1, are emitted above the light guide LG.

The portion RB1*b*, as in the case of the portion RV1, extends in a direction parallel to the second direction Y. The light LTa and the light LTb reflected by the portions RB1*b* have their main optical paths approximately parallel to the first direction X. Therefore, the light LTa and the light LTb each have a uniform luminance distribution.

In this embodiment, the edge LB1*a* of the light guide LG has a length dx1 and the edge LB1*b* has a length dy1, which are both 1 mm. The length of the entire staircase-shaped edge LB1 along the first direction X and the length along the second direction Y are both 10 mm. But, the lengths are not limited to these, but may be determined appropriately as needed.

With this embodiment, it is possible to obtain an illumination device which emits light with a uniform luminance distribution, and a display device which emits video light with a uniform luminance distribution by being illuminated by the illumination light.

Configuration Example 1

Figure 8:
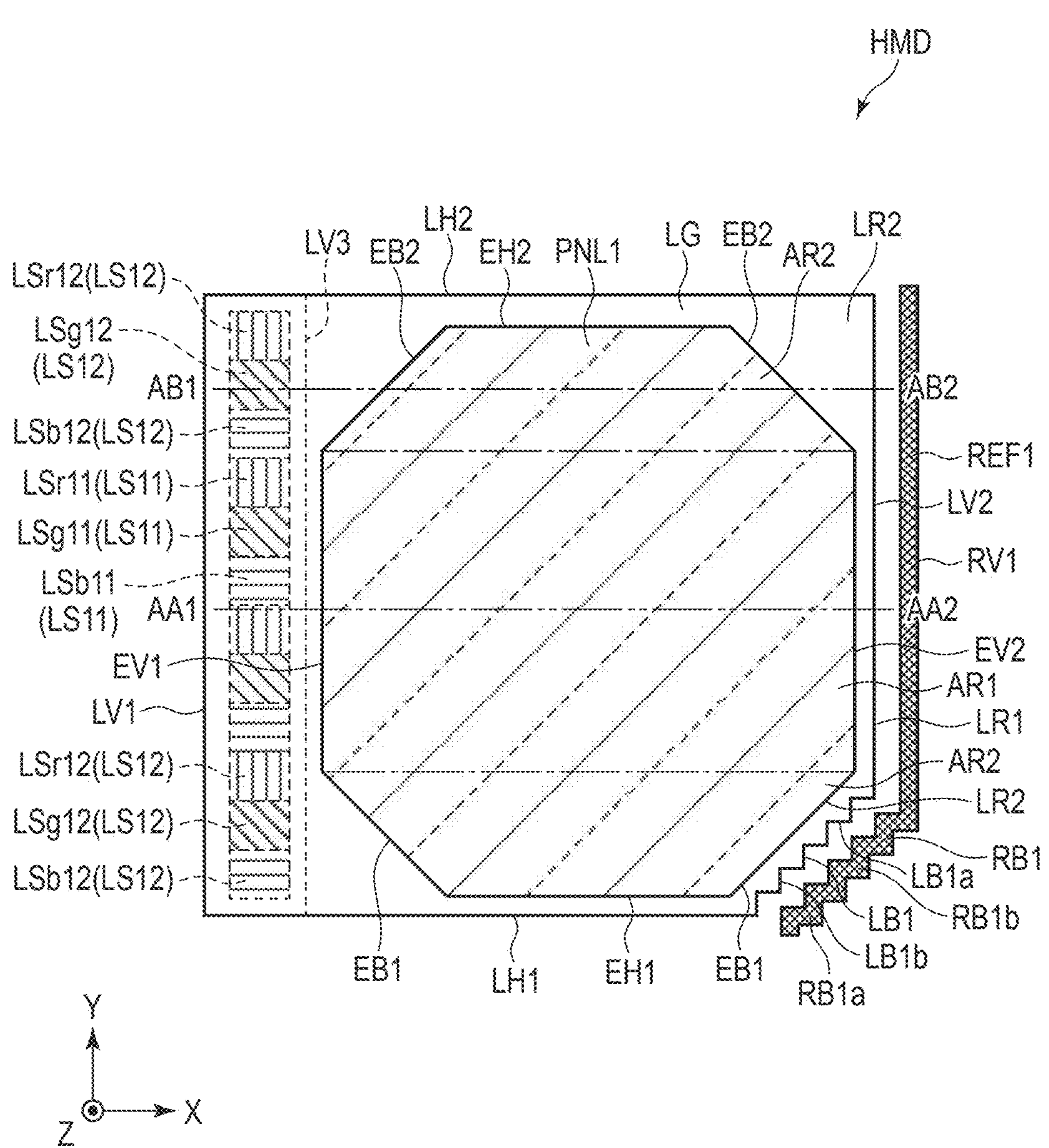
FIG. 8 is a plan view showing a configuration example of a display device in an embodiment.

FIG. 8 is a plan view showing another configuration example of the display device in the embodiment. The configuration example shown in FIG. 8 is different from that of FIG. 6 in that the output of the light source element is changed based on the shape of the display panel.

The display panel PNL1 has a polygonal shape. An example of the polygonal shape is a rectangular shape with its corners notched, that is, an octagonal shape. It can be said that an octagon consists of one rectangle and two trapezoids interposing the rectangle. In FIG. 8, the areas of the rectangular and the trapezoids are referred to as AR1 and AR2, respectively. Along the second direction Y, the area AR2, area AR1 and area AR2 are arranged side by side. In other words, the area AR1 is interposed between the two areas AR2 along the second direction Y.

The area AR1 includes edges EV1 and EV2. The area AR2 includes an edge EH1, edge EH2, edge EB1 and edge EV2.

In this configuration example, an octagonal shape is given as an example of the polygonal shape, but the shape of the display panel PNL1 is not limited to this. Besides the octagonal shape, a pentagonal shape formed by notching one corner of a rectangle may as be presented.

The light source element disposed adjacent to the area AR1 is designated as a light source element LS11. The light source element LS11 includes a light source element LSr11 which emits red light, a light source element LSg11 which emits green light and a light source element LSb11 which emits blue light.

The light source element disposed adjacent to the area AR2 is referred to as a light source element LS12. The light source element LS12 includes a light source elements LSr12 which emits red light, a light source element LSg12 which emits green light and a light source element LSb12 which emits blue light.

Light emitted from the light source element LS11 is output from the area AR1, and light emitted from the light source element LSg12 is output from the area AR2. Here, the area AR1 is great than the area AR2 in area, and therefore when the light emitted from the light source element LS11 and the light emitted from the light source element LS12 have the same intensity, the luminance of the area AR2 is higher.

Therefore, in this configuration example, the intensity of the light emitted from the light source element LS12 is reduced to lower than the intensity of the light emitted from the light source element LS11. Thus, the luminance of the area AR1 is equalized to that of the area AR2, and therefore uniform display can be achieved across the entire display panel PNL1.

In order to make the luminance uniform in both the area AR1 and the area AR2, the height of the convex portion (groove) of the light guide LG is changed.

Figure 9A:
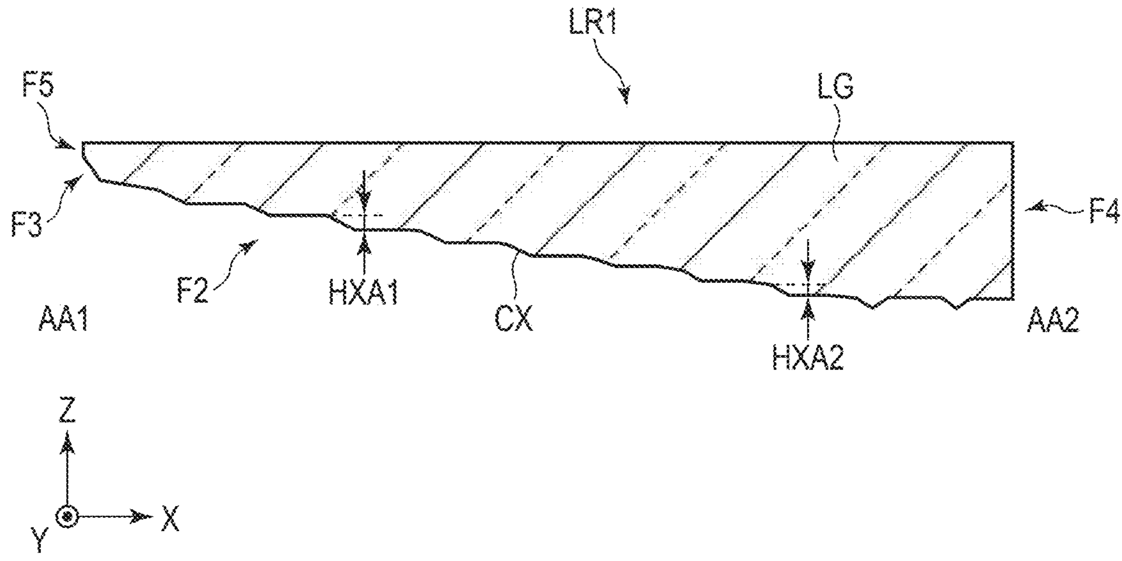
FIG. 9A is a cross-sectional view schematically showing a configuration example of a light guide taken along line AA1-AA2 in FIG. 8.
Figure 9B:
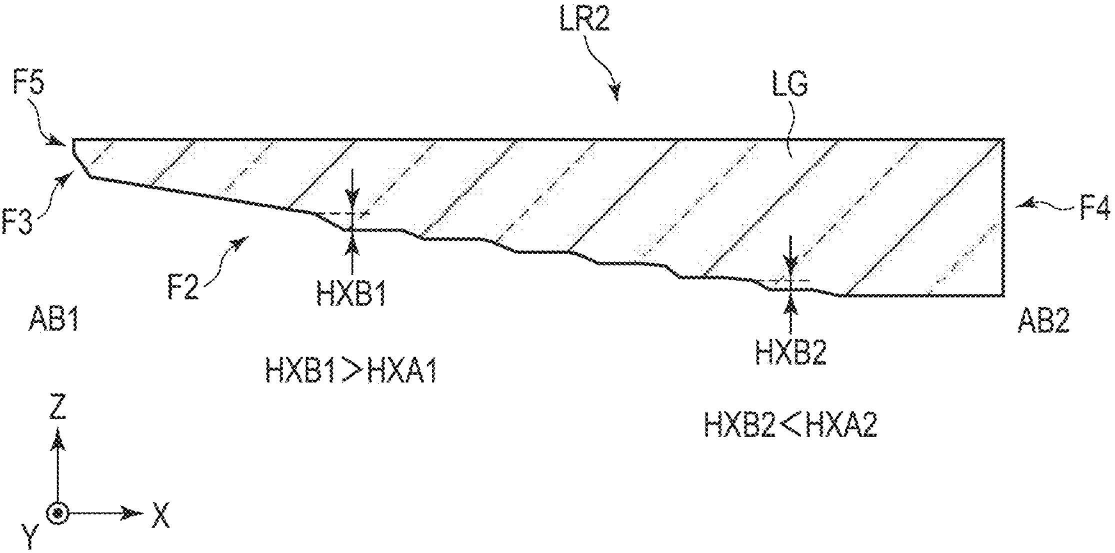
FIG. 9B is a cross-sectional view schematically showing a configuration example of the light guide taken along line AB1-AB2 in FIG. 8.

FIG. 9A is a cross-sectional view schematically showing a configuration example of a light guide taken along line AA1-AA2 in FIG. 8. FIG. 9B is a cross-sectional view schematically showing a configuration example of a light guide taken along line AB1-AB2 in FIG. 8. In other words, FIG. 9A shows a cross-sectional configuration of the area LR1 of the light guide LG overlapping the area AR1, and FIG. 9B shows a cross-sectional configuration of the area LR2 of the light guide LG overlapping the area AR2.

On the second main surface F2 of the light guide LG, a convex portion CX is provided to extend along the second direction Y. Here, let us suppose as shown in FIG. 9A that the convex portion CX on an side to the light source element side (which may as well be referred to as a light input side) of the area LR1 of the light guide LG has a height HXA1. On the other hand, the convex portion CX on an opposite side to the light source element side (which may as well be referred to as a light source element opposite side or a light entry opposite side) of the area LR1 has a height HXA2. The light source element side refers to the area near the inclined surface F5 and the first side surface F3, and the light source element opposite side refers to the area near the second side surface F4.

Further, let us suppose as shown in FIG. 9B that the convex portion CX on the light source element side of the area LR2 of the light guide LG has a height HXB1. On the other hand, the convex portion CX on the light source element opposite side of the area LR2 has a height HXB2. On the light source element side, with respect to the heights of the convex portions CX of the areas LR1 and LR2, which are located at the same position along the first direction X, the convex portion CX is higher in the area LR2. In other words, HXB1>HXA1. On the other hand, with respect to the heights of the convex portions CX of the areas LR1 and LR2, which are located at the same position along the first direction X on the light source element opposite side, the convex portion CX is lower in the area LR2. In other words, HXB2<HXA2.

In order to achieve uniform luminance in the area AR1, the height of the convex portion CX in the region LR1 of the light guide LG 1 is higher on the light source element side and lower on the light source element opposite side. Similarly, the height of the convex portion CX in the area LR2 of the light guide LG is higher on the light source element side and lower on the light source element opposite side. However, the height distribution of the convex portion CX to achieve uniform luminance in the areas AR1 and AR2 differs from the region LR1 to the region LR2. Here, as described before, by setting the relationships of HXB1>HXA1 and HXB2<HXA2, the uniform luminescence can be obtained in the areas AR1 and AR2.

Further, since the display area of the display panel PNL1 is notched in the region LR2, the convex portion CX need not be provided.

In this configuration example as well, an advantageous effect similar to that of the embodiment can be exhibited.

Configuration Example 2

Figure 11:
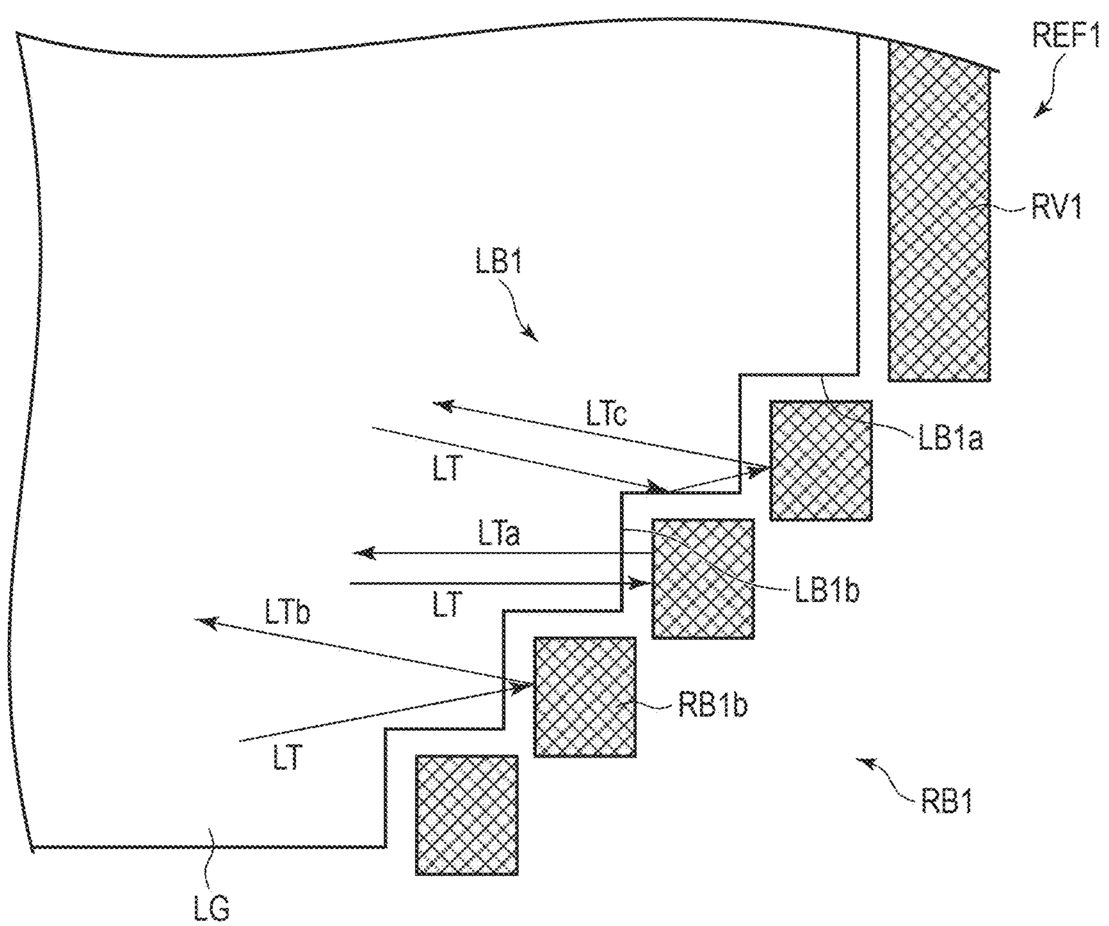
FIG. 11 is a partially enlarged view of FIG. 10.

FIG. 10 is a plan view of another configuration example of the display device in the embodiment. The configuration example shown in FIG. 10 is different from that of FIG. 8 in that only a part of the reflective plate, which extends along the second direction Y is provided. FIG. 11 is a partially enlarged view of FIG. 10.

In FIG. 6, the portion RB1 of the reflector REF1 includes portions RB1*a* extending along the first direction X and portions RB1*b* extending along the second direction Y. In FIG. 10, on the other hand, the portion RB1*a* is not provided. That is, the reflector REF1 comprises a portion RV1 extending along the second direction Y and portions RB1*b*, which are short pieces extending along the second direction Y. The portions RB1*b* are arranged to be spaced apart from each other.

As explained in FIG. 7, the light LT is reflected only by the portions RB1*b* of the reflector REF1. Therefore, the light LT does not enter the portions RB1*a* of the reflector REF1. Thus, in this configuration example, the portion RB1 of the reflector REF1 comprises only the portions RB1*b* without providing the portions RB1*a*. In this configuration as well, the light emitted from the edge LB1*b* of the light guide LG is reflected by the portions RB1*b*, and can re-enter the light guide LG.

In this configuration example as well, an advantageous effect similar to that of the embodiment can be exhibited.

In this embodiment, the edges LH1, LV2, LB1 and LV2 of the light guide LG may as well be referred to as first, second, third and fourth edges, respectively. The edge LB1*a* and edge LB1*b* of the light guide LG may as well be referred to as first and second short edges, respectively.

The portion RV1 and the portion RB1 of the reflector REF1 may as well be referred to as first and second portions, respectively. The portions RB1*a* and the portions RB1*b* may as well be referred to as first pieces and second pieces, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:

a light guide including a first edge extending in a first direction, a second edge extending in a second direction intersecting the first direction, a third edge provided between the first edge and the second edge, and a fourth edge extending in the second direction and opposing the second edge;

a plurality of light source elements adjacent to and opposing the fourth edge of the light guide; and a reflector including a first portion parallel to the second edge and a second portion parallel to the third edge, wherein the third edge includes first short edges extending in the first direction and second short edges extending in the second direction, which are arranged alternately in the first direction or the second direction so that the third edge has a step-like shape, the second portion includes first pieces extending in the first direction and second pieces extending in the second direction, which are arranged alternately in the first direction or the second direction so that the second portion has a step-like shape, each of the first short edges opposes each of the first pieces, each of the second short edges opposes each of the second pieces, each of the first short edges is spaced apart from each of the first pieces, each of the second short edges is spaced apart from each of the second pieces, and emission surfaces of all of the light source elements are aligned in a straight line in the second direction.

2. The illumination device according to claim 1, wherein the plurality of light source elements are each a laser light source emitting a laser beam.

3. A display device comprising:

an illumination device comprising:

a light guide including a first edge extending in a first direction, a second edge extending in a second direction intersecting the first direction, a third edge provided between the first edge and the second edge, and a fourth edge extending in the second direction and opposing the second edge;

a plurality of light source elements adjacent to and opposing the fourth edge of the light guide; and a reflector including a first portion parallel to the second edge and a second portion parallel to the third edge; and a polygonal display panel comprising a rectangular-shaped first area and two trapezoid-shaped second areas interposing the first area therebetween, which are disposed along the second direction, wherein the third edge includes first short edges extending in the first direction and second short edges extending in the second direction, which are arranged alternately in the first direction or the second direction so that the third edge has a step-like shape, the second portion includes first pieces extending in the first direction and second pieces extending in the second direction, which are arranged alternately, each of the first short edges opposes each of the first pieces, each of the second short edges opposes each of the second pieces, each of the first short edges is spaced apart from each of the first pieces, each of the second short edges is spaced apart from each of the second pieces, and emission surfaces of all of the light source elements are aligned in a straight line in the second direction.

4. The display device according to claim 3, wherein the plurality of light source elements are each a laser light source emitting a laser beam.

5. The display device according to claim 3, wherein a first light source element of the plurality of light source elements, which illuminates the first area has a luminance of emitting light higher than that of a second light source element which illuminates the second area.

6. The display device according to claim 5, wherein the light guide includes a plurality of convex portions extending in the second direction, and a distribution in height of the convex portions provided in an area of the light guide, which overlaps the first area is different from a distribution in height of the convex portions provided in an area of the light guide, which overlaps the second area.

7. A display device comprising:

an illumination device comprising:

a light guide including a first edge extending in a first direction, a second edge extending in a second direction intersecting the first direction, a third edge provided between the first edge and the second edge, and a fourth edge extending in the second direction and opposing the second edge;

a plurality of light source elements adjacent to and opposing the fourth edge of the light guide; and a reflector including a first portion parallel to the second edge and a second portion parallel to the third edge; and a polygonal display panel comprising a rectangular-shaped first area and two trapezoid-shaped second areas interposing the first area therebetween, which are disposed along the second direction, wherein the third edge includes first short edges extending in the first direction and second short edges extending in the second direction, which are arranged alternately in the first direction or the second direction so that the third edge has a step-like shape, the second portion includes a plurality of pieces extending in the second direction and spaced apart from each other, each of the second short edges opposes each of the plurality of pieces, each of the second short edges is apart from each of the plurality of pieces, and emission surfaces of all of the light source elements are aligned in a straight line in the second direction.

8. The display device according to claim 7, wherein the plurality of light source elements are each a laser light source emitting a laser beam.

9. The display device according to claim 7, wherein a first light source element of the plurality of light source elements, which illuminates the first area has a luminance of emitting light higher than that of a second light source element which illuminates the second area.

10. The display device according to claim 9, wherein the light guide includes a plurality of convex portions extending in the second direction, and a distribution in height of the convex portions provided in an area of the light guide, which overlaps the first area is different from a distribution in height of the convex portions provided in an area of the light guide, which overlaps the second area.

* * * * *